(12) United States Patent
Janelle et al.

(10) Patent No.: US 9,814,171 B2
(45) Date of Patent: Nov. 14, 2017

(54) WALKING BEAM CLOSING DISK ASSEMBLY

(71) Applicant: DEERE & COMPANY, Moline, IL (US)

(72) Inventors: Luc Janelle, Ankeny, IA (US); Adam D. Sporrer, Ames, IA (US); Jeremy Nefzger, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 276 days.

(21) Appl. No.: 14/459,894

(22) Filed: Aug. 14, 2014

(65) Prior Publication Data

US 2016/0044856 A1 Feb. 18, 2016

(51) Int. Cl.
*A01B 39/22* (2006.01)
*A01B 21/08* (2006.01)

(52) U.S. Cl.
CPC .............. *A01B 39/22* (2013.01); *A01B 21/08* (2013.01)

(58) Field of Classification Search
CPC ........... A01C 5/06; A01C 5/066; A01C 5/068; A01C 7/006; A01B 39/22; A01B 35/16
See application file for complete search history.

(56) References Cited

U.S. PATENT DOCUMENTS

| | | | | |
|---|---|---|---|---|
| 985,589 | A * | 2/1911 | Harris, Jr. ............... | A01C 5/066 111/192 |
| 4,366,760 | A * | 1/1983 | Dreyer .................... | A01C 7/201 111/194 |
| 4,407,207 | A * | 10/1983 | Dreyer ..................... | A01C 5/06 111/136 |
| 4,974,684 | A * | 12/1990 | Stevens ................ | A01B 73/046 172/311 |
| 5,080,178 | A * | 1/1992 | Dietrich, Sr. ......... | A01B 21/086 172/153 |
| 5,782,307 | A * | 7/1998 | Forsyth ................ | A01C 23/025 172/156 |
| 5,957,217 | A * | 9/1999 | Gunnink ................ | A01B 35/16 172/166 |
| 6,276,462 | B1 * | 8/2001 | Dietrich, Sr. .......... | A01B 49/02 172/138 |
| 6,575,104 | B2 * | 6/2003 | Brummelhuis ........ | A01C 5/064 111/139 |
| 7,044,070 | B2 | 5/2006 | Kaster et al. | |
| 7,581,503 | B2 * | 9/2009 | Martin ................... | A01C 5/066 111/167 |
| 8,016,044 | B2 | 9/2011 | Kromminga et al. | |

(Continued)

OTHER PUBLICATIONS

John Deere, Primary Tillage Brochure, Dec. 2012.
Case IH, Ecolo-Tiger 870 Brochure, © 2009 CNH America LLC.

*Primary Examiner* — Matthew D Troutman (57) ABSTRACT

An agricultural implement has a closing disk assembly for closing furrows along a section of ground. The closing disk assembly has a pair of closing disks attached to opposite sides and opposite ends of a walking beam. The closing disks are offset from a reference plane of the closing disk assembly. The walking beam is rotatably coupled to the closing disk assembly through a rocker assembly, a support arm, and a mounting assembly. The walking beam may rotate relative to the rocker assembly to account for variations in the angle of the ground relative to the disks.

12 Claims, 11 Drawing Sheets

(56) References Cited

U.S. PATENT DOCUMENTS

| | | | |
|---|---|---|---|
| 8,356,563 B2* | 1/2013 | Schaffert | A01C 5/064 |
| | | | 111/121 |
| 8,657,023 B2* | 2/2014 | Casper | A01B 63/111 |
| | | | 172/145 |
| 2005/0155536 A1* | 7/2005 | Wendte | A01C 5/068 |
| | | | 111/200 |
| 2005/0172872 A1* | 8/2005 | Kaster | A01C 7/006 |
| | | | 111/164 |
| 2006/0021768 A1 | 2/2006 | Ankenman | |
| 2009/0056962 A1* | 3/2009 | Martin | A01C 5/066 |
| | | | 172/551 |
| 2010/0096149 A1* | 4/2010 | Friggstad | A01C 7/203 |
| | | | 172/574 |
| 2011/0100653 A1* | 5/2011 | Kromminga | A01B 49/02 |
| | | | 172/145 |

* cited by examiner

WALKING BEAM CLOSING DISK ASSEMBLY

CROSS-REFERENCE TO RELATED APPLICATION(S)

Not Applicable.

STATEMENT OF FEDERALLY SPONSORED RESEARCH OR DEVELOPMENT

Not applicable.

FIELD OF THE DISCLOSURE

This disclosure relates to agricultural implements, and in particular to closing disk assemblies of such implements.

BACKGROUND OF THE DISCLOSURE

Agricultural implements and machines, such as various plows, tillers, rippers, seeders, nutrient applicators, etc., are used to work soil for growing crops. Tillage and other agricultural implements can perform a variety of tasks, such as breaking up tough soil, injecting nutrients into the soil, and leveling the soil. Such implements are commonly towed behind work vehicles, such as tractors, and can be outfitted with a variety of ground-engaging tools, such as shanks and disks, depending on the soil preparation operation being carried out.

The ability to efficiently and effectively conduct soil preparation operations is highly effected by the soil conditions, such as the wetness of the soil, how much crop residue is in the soil, and the general composition of the soil. In some agricultural implements, ground-engaging tools may suffer from a buildup of soil and crop residue, especially when the soil is particularly wet, resulting in decreased efficiency of the ground-engaging tools and potentially clogging the ground-engaging tools. This may require the operator of the work vehicle and agricultural implement to stop and exit the machine to manually unclog or clean the ground-engaging tools, resulting in lost time and decreased productivity. Another issue, which can be worsened by the clogging problem just mentioned, is maintaining proper contact of the ground-engaging tools with the ground to achieve the desired soil preparation, be it achieving and maintaining a sufficient depth into the ground, or a consistent depth across the width of the implement transverse to the travel direction of the machine.

These issues can be particularly troublesome for closing disk arrangements on tillage or other implements. Closing disks are typically used to fill in furrows, or trenches, and either level, or form mounded rows for later compaction of, the soil that was displaced by the ground-engaging tools located ahead of the closing disks on the implement. Improper or inconsistent closing disk operation can result in trenches being left open or insufficiently filled.

SUMMARY OF THE DISCLOSURE

A closing disk assembly for an agricultural implement is disclosed. The closing disk assembly may include a pair of closing disks coupled to a walking beam that more easily follows the contours of the ground to reduce clogging, compared to a traditional closing disk system.

According to one aspect of the disclosure, a closing disk assembly for an agricultural implement is provided. The closing disk assembly is attached to a support frame through a mounting assembly. First and second closing disks are rotatably mounted on opposite ends and opposite sides of a walking beam. The first and second closing disks are offset from a reference plane of the closing disk assembly. The walking beam is pivotally connected to a rocker assembly, which is attached to a support arm.

According to another aspect, the disclosure provides an agricultural implement having a support frame and a disk gang having a plurality of closing disk assemblies mounted onto the support from. The closing disk assemblies have a mounting assembly, a support arm pivotally coupled to the mounting assembly, a rocker assembly coupled to the support arm, walking beam pivotally coupled to the rocker assembly, and a first and second closing disks mounted to the walking beam. The walking beam pivots about an axis perpendicular to the direction of travel of the agricultural implement and each disk mount is mounted on an opposite side of the pivot axis. The disk mounts are also mounted to opposite sides of the walking beam.

According to another aspect, the disclosure provides an agricultural implement having a support frame and a disk gang having a plurality of closing disk assemblies mounted onto the support from. The closing disk assemblies have a mounting assembly, a support arm pivotally coupled to the mounting assembly, a rocker assembly coupled to the support arm, walking beam pivotally coupled to the rocker assembly, and first and second closing disks mounted to the walking beam. The walking beam pivots about an axis perpendicular to the direction of travel of the agricultural implement and each disk mount is mounted on an opposite side of the pivot axis. The disk mounts are also mounted to opposite sides of the walking beam. The first closing disk pivots about a first axis, and the second closing disk pivots about a second axis. The first and second axes for a first angle and a second angle, respectively, with the pivot axis.

These and other features and advantages of the present disclosure will become clear to a person skilled in the art after reading the following detailed description and in consideration of the drawings.

BRIEF DESCRIPTION OF THE DRAWINGS

Like reference numerals in the drawings indicate like components, parts, or operations.

DETAILED DESCRIPTION

The following describes one or more example embodiments of the disclosed walking beam closing disk assembly, as shown in the accompanying figures of the drawings described briefly above. Various modifications to the example embodiments may be contemplated by one of skill in the art.

Figure 1:
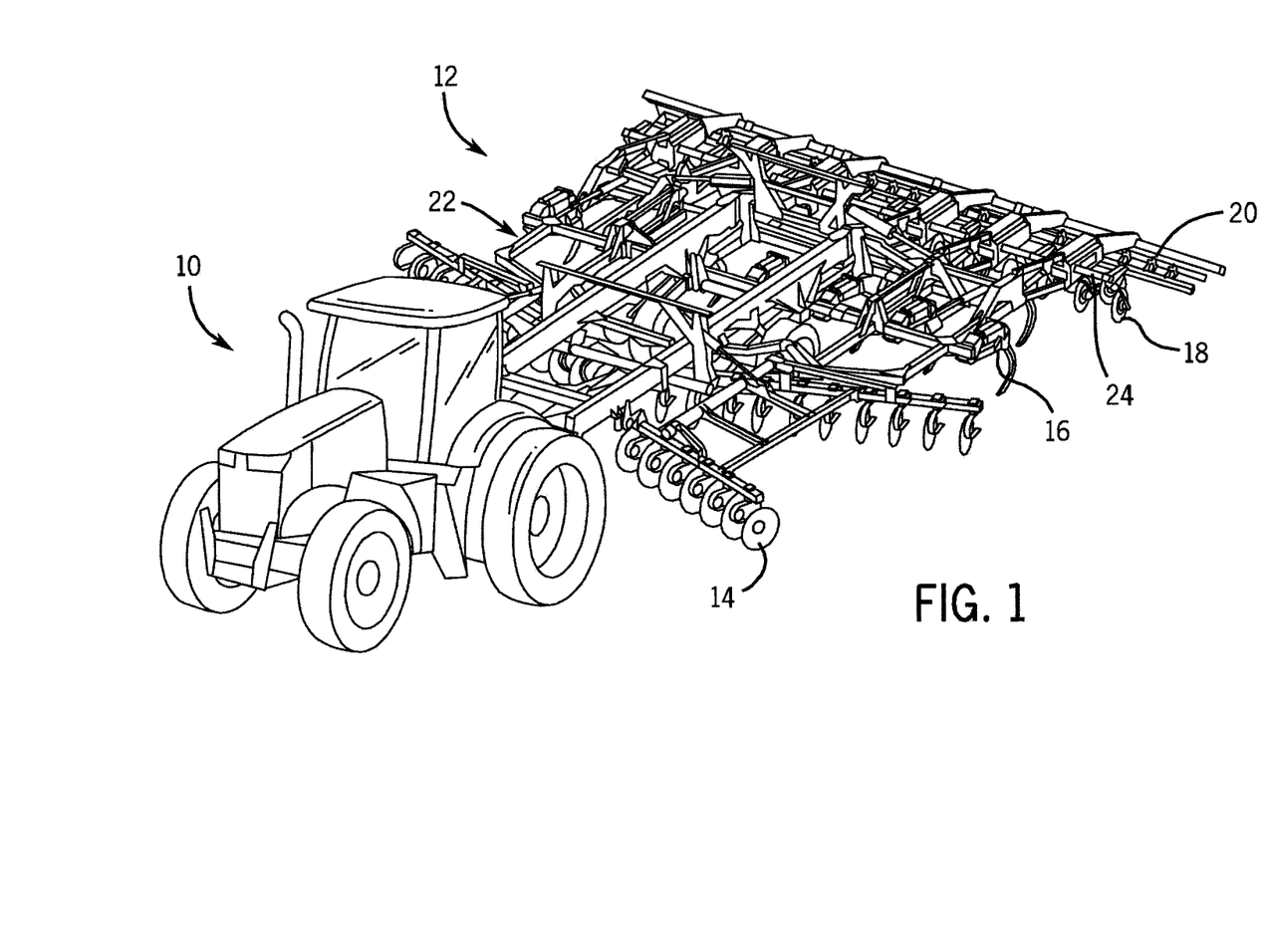
FIG. 1 is a perspective view showing an example work vehicle with an example agricultural implement having walking beam closing disk assemblies according to the present disclosure.

FIG. 1 shows an example work vehicle 10, such as an agricultural tractor, pulling an agricultural implement 12. The work vehicle 10 moves forward in a direction of travel, and has a right and a left side. The agricultural implement 12 may include a variety of ground-engaging tools, such as rippers, cutters, chiselers, tillers, and specifically opening disk assemblies 14, shanks 16, closing disk assemblies 18, and rolling baskets 20, connected to a main frame 22 of interconnecting tubular frame members 24. It will be understood that the agricultural implement make have various other configurations. The ground-engaging tools may be used for creating furrows, or trenches, in the ground. The closing disk assemblies 18 may be used for closing the furrows.

Figure 2:
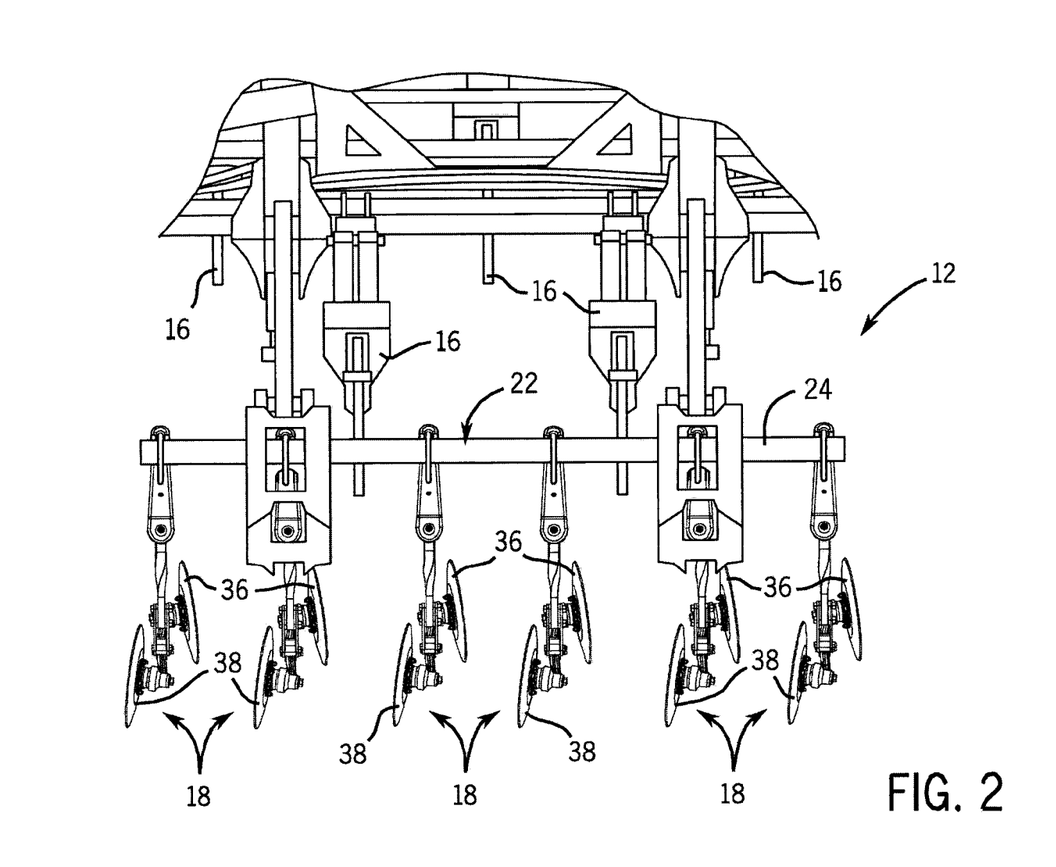
FIG. 2 is a partial top view of the agricultural implement of FIG. 1 showing a section of the closing disk assemblies.

Referring to FIGS. 1-4, a plurality of closing disk assemblies 18 may be mounted to the frame 22 and spaced apart perpendicular to the direction of travel. It will be appreciated that the spacing between the closing disk assemblies 18 may be set to account for the location of the ground-engaging tools, such as to center adjacent pairs of closing disk assemblies 18 on centerlines 25 (one shown in FIG. 3) of the ground-engaging shanks 16, as shown in FIG. 2. The adjacent pairs of closing disk assemblies 18 may be arranged so that the two opposing disks facing the centerline are staggered in the fore/aft direction relative to one another to reducing the occurrence of clogging. It will be appreciated that the closing disk assemblies 18 may alternatively be mounted at different fore/aft and left/right locations along the main frame 22.

Referring also to FIGS. 5-10, each closing disk assembly 18 has a mounting assembly 26, a helical recoil spring 28, a support arm 30, a rocker assembly 32, a walking beam 34, a forward closing disk 36, and a rearward closing disk 38.

Figure 4:
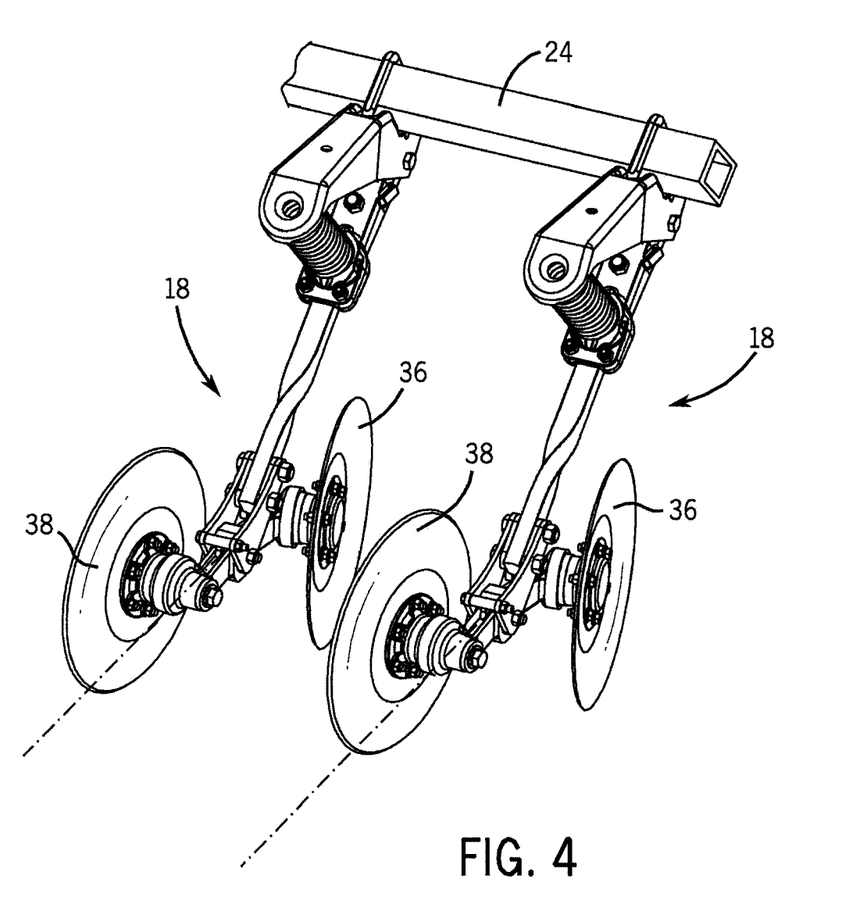
FIG. 4 is a partial rear perspective of the agricultural implement of FIG. 1 showing two closing disk assemblies enlarged.

The mounting assembly 26 may be used to connect the closing disk assembly 18 to one of the tubular frame members 24 of the main frame 22. The mounting assembly 26 may have a mounting channel 40 with a lip 42 and a notch 44. The lip 42 may have a spring retainer 46 for accepting the recoil spring 28. The mounting assembly 26 may be releasably secured to the tubular frame member 24 via a channel clamp 52, as shown in FIG. 4. The channel clamp 52 has threaded terminal ends that fit through a pair of holes in the mounting channel 40 and receive threaded nuts. A pivot pin 54 is used to mount a pivot arm 56 to the mounting channel 40, and a spring retainer 58 on the pivot arm 56 couples to the lower end of the recoil spring 28. The recoil spring 28 limits the pivotal movement of the pivot arm 56 and biases the closing disk assembly 18 into a home position, as shown in FIG. 5, in which the support arm 30 is oriented to position the closing disks 36 and 38 in contact the ground.

The support arm 30 may be a long, generally rectangular piece of metal. The support arm 30 may have a rectangular cross-section and a twist of 90 degrees along its length, such that it is wider than tall where it connects to the mounting assembly 26 and has the opposite orientation where it connects to the rocker assembly 32. It should be understood that the support arm 30 may be straight along its entire length, and could have a variety of cross-sections, such as rectangular or square. The support arm 30 connects the rocker assembly 32 to the mounting assembly 26 using any suitable connection technique (e.g., bolts, welding, etc.).

Figure 5:
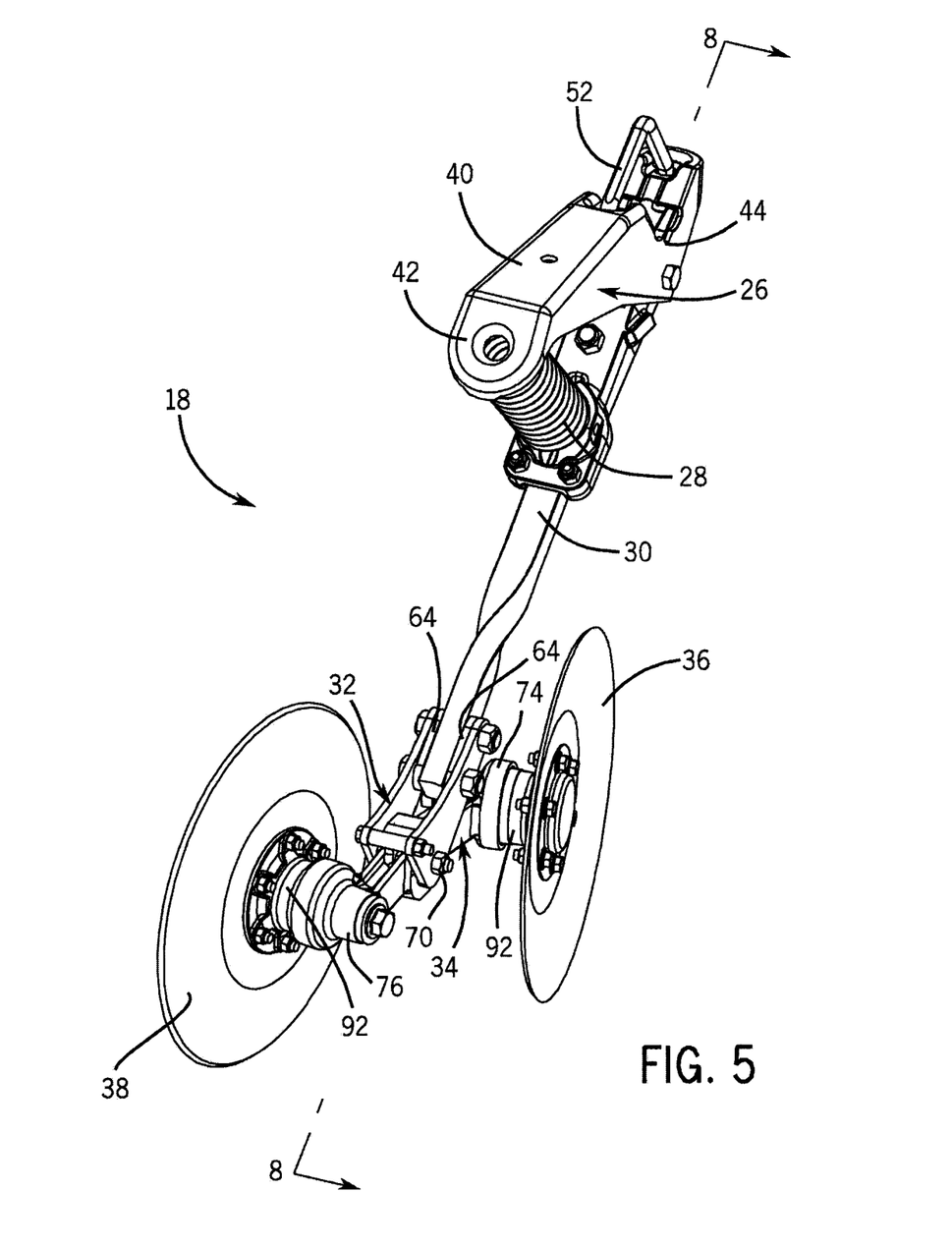
FIG. 5 is a rear perspective view of one closing disk assembly for the agricultural implement of FIG. 1.
Figure 10:
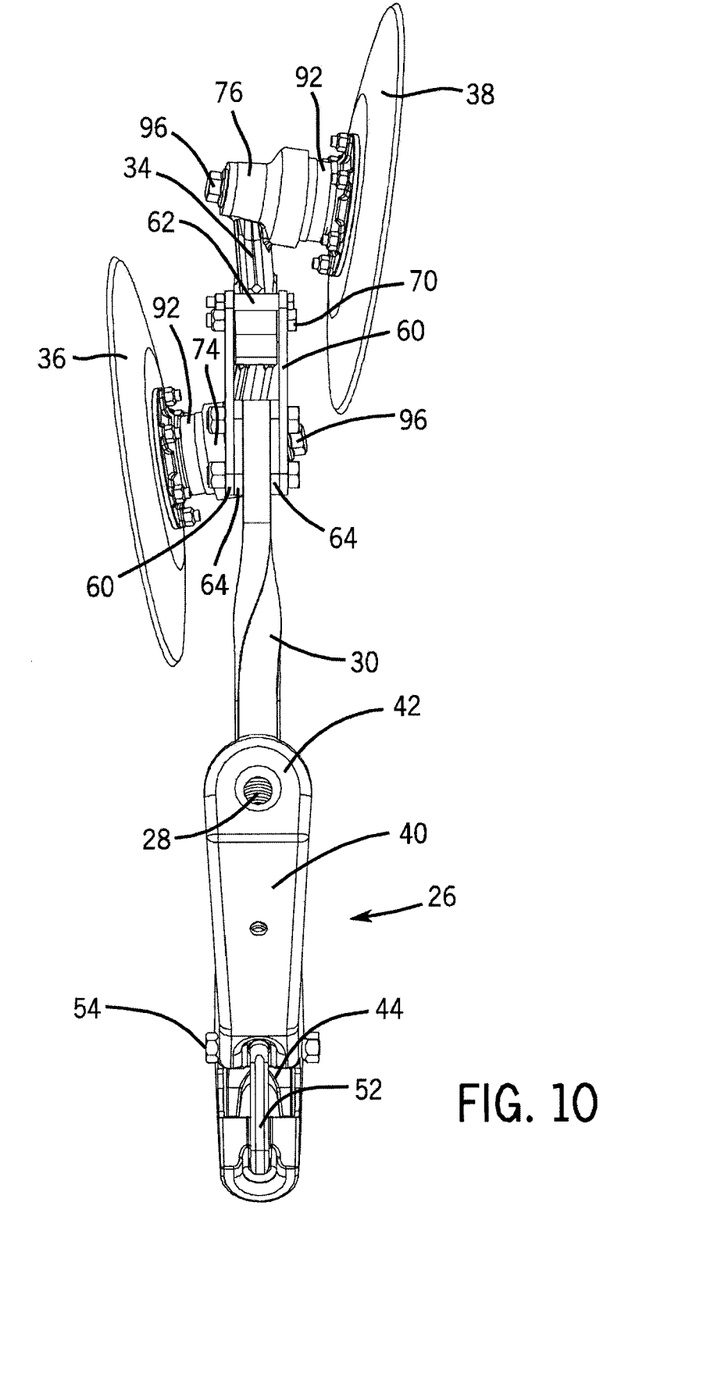
FIG. 10 is a top view of the closing disk assembly of FIG. 5.

The rocker assembly 32 may include two horizontally spaced-apart triangular side plates 60, as shown in FIGS. 5 and 10. The side plates 60 may be spaced apart at a first location by a spacer 62 and held in place by a fastener, such as a nut and bolt. The spacer 62 may also act as a rotation limiter, or end stop, for pivoting of the walking beam 34 relative to the rocker assembly 32. For example, the spacer 62 may limit rotation of the walking beam 34 to about less than 45 degrees form the home position, such as 30 degrees. Two shim spacers 64 are mounted between the side plates 60 on each side of the support arm 30. The end of the support arm 30 connected to the rocker assembly 32 may be used as a second rotation limiter, or end stop, for pivoting of the walking beam 34 relative to the rocker assembly 32 to about less than 45 degrees, such as 35 degrees. The outer race of a bearing 66 is mounted within a center hub 68 of the walking beam 34 between the center of the side plates 60, which is supported by a stationary axle 70 mounted to the side plates 60 and the inner race of the bearing 66. The axle 70 extends along a pivot axis 71.

Figure 11:
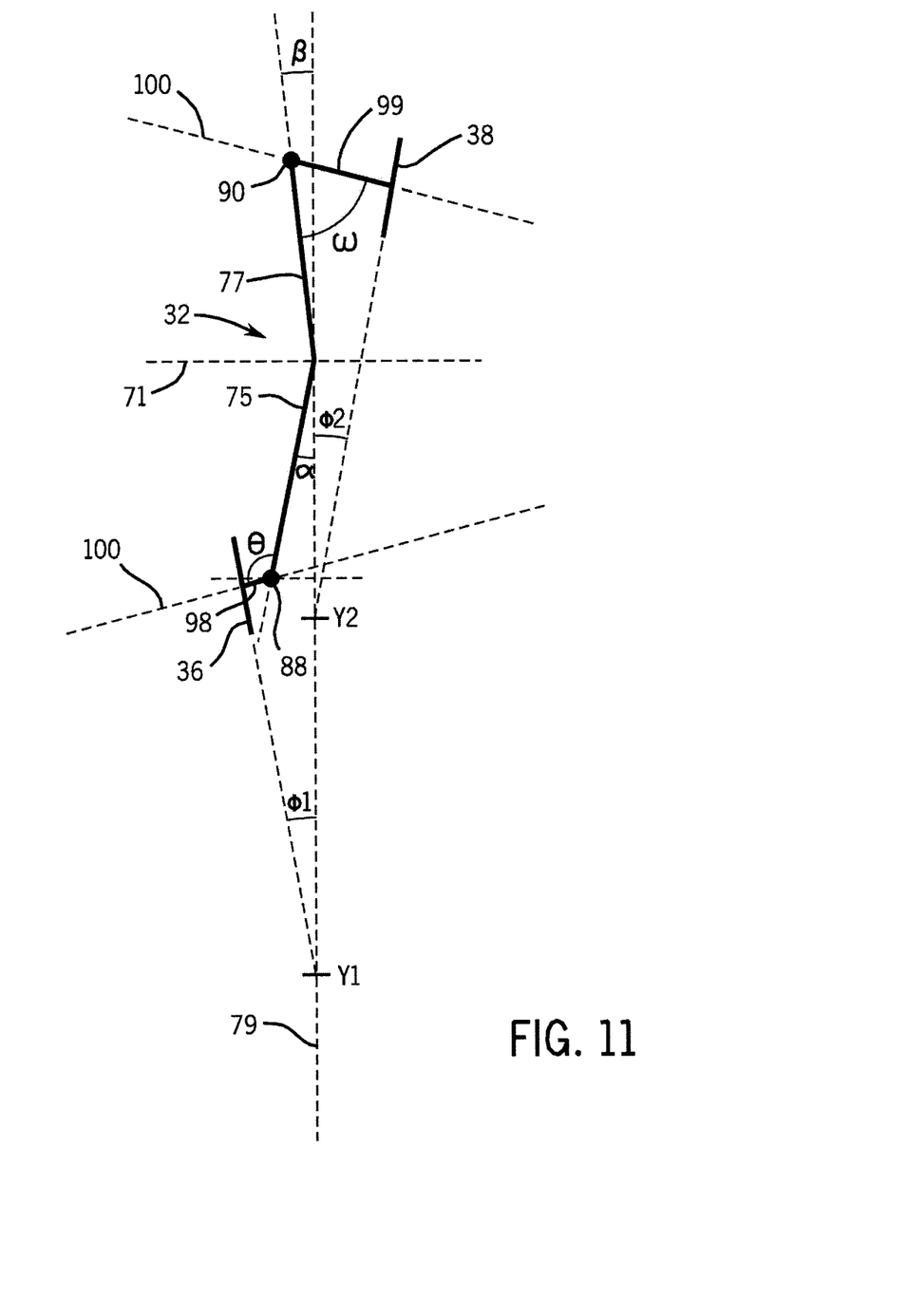
FIG. 11 is a force diagram of the walking beam and closing disks of the closing disk assembly of FIG. 5.
Figure 12:
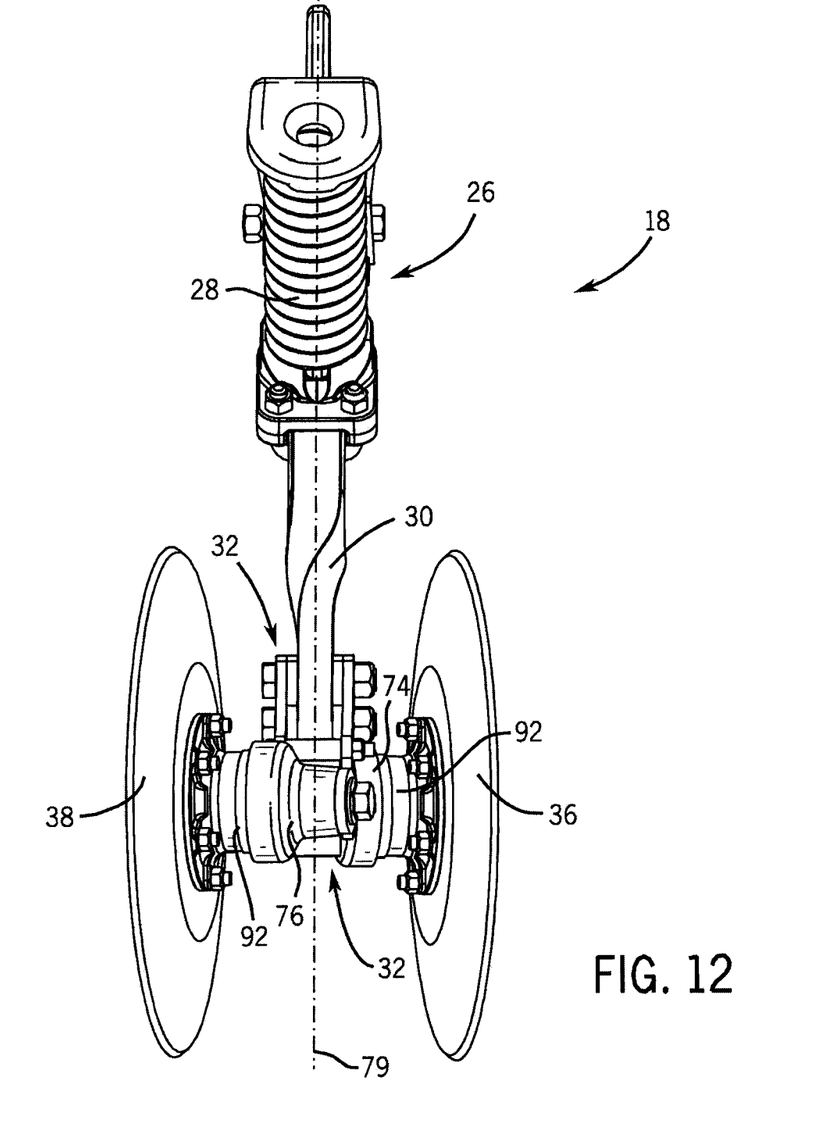
FIG. 12 is a rear view of the closing disk assembly of FIG. 5.
Figure 13:
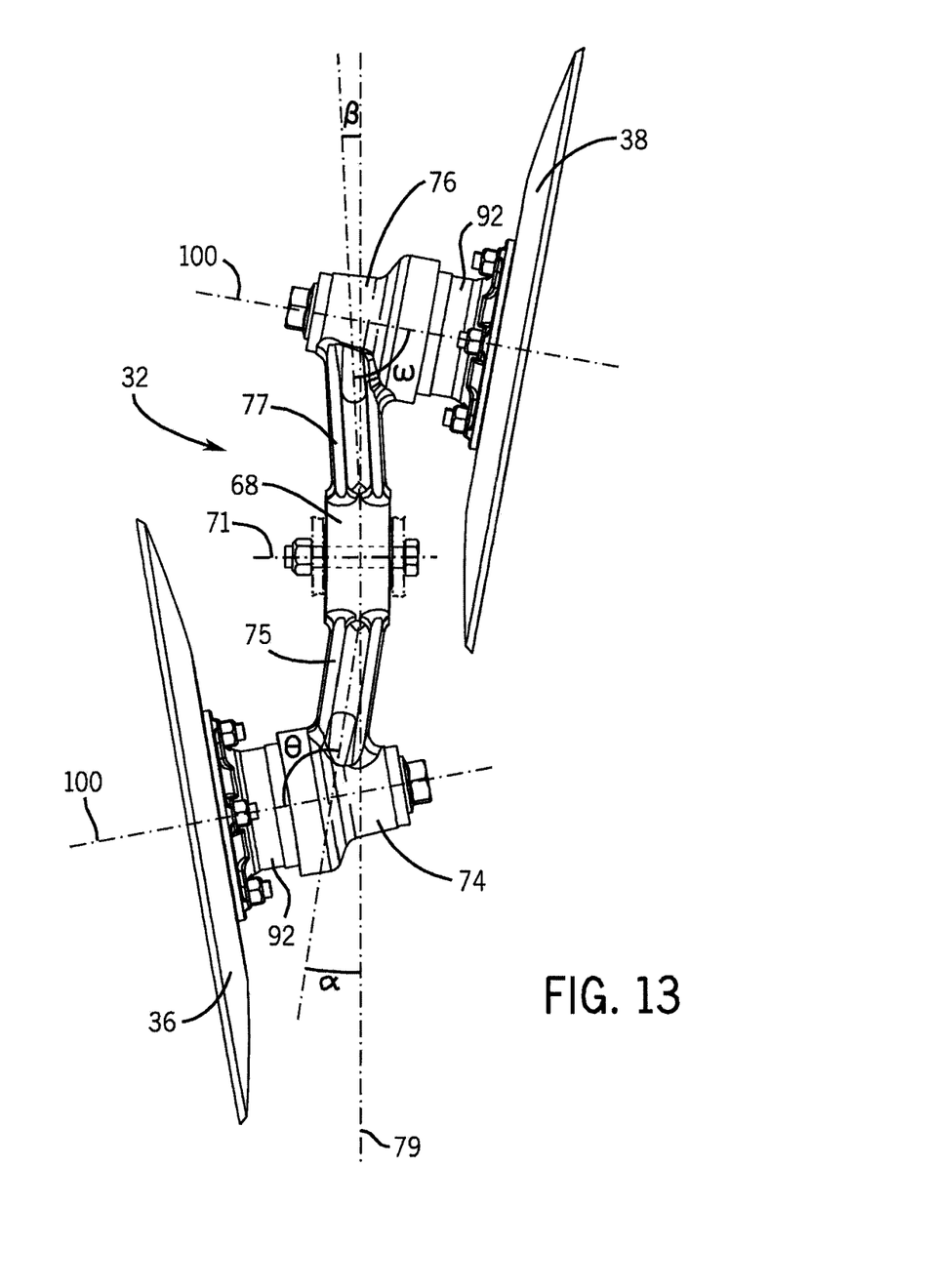
FIG. 13 is a top view of the walking beam and closing disks of the closing disk assembly of FIG. 5.

Referring now also to FIGS. 11 and 13, the walking beam 34 may be an elongated beam having a first disk mount 74 and a second disk mount 76 on each side of the center hub 68 to provide for tandem mounting of the closing disks 36 and 38. A first beam segment 75 may extend between the center hub 68 and the first disk mount 74, and a second beam segment 77 may extend between the center hub 68 and the second disk mount 76. The beam segments 75 and 77 may have complex cross-sections, such as a structural "H" or "I" cross-sectional configuration. Each of the closing disks 36 and 38, which may be generally circular and concave, may be bolted between an axle hub 92 and a hub cover 94. Each axle hub 92 may be rotatably mounted to the disk mounts 74 and 76 about a pivot axis 100, such as through a bearing or spindle (not shown), and secured by fastener 96. In the illustrated example, the closing disks 36 and 38 are canted inward toward the walking beam 34, as shown in FIG. 5, in the direction of travel.

The pivot axis 71 may be located centrally between the closing disks 36 and 38, and the beam segments 75 and 77 may be of the same length, or similar lengths, as in the illustrated example. It should be understood that the pivot location and the beam segment lengths could be different from the illustrated example. For instance, the pivot axis 71 may be shifted between the ends of the walking beam 34, such as within a central region defined by the center hub 68 offset from its center, or even within an expanded central region including one or more of the beam segments 75 and 77. Shifting the pivot axis 71 in this manner would effectively increase the length of one beam segment and decrease the length of the other beam segment. A generally horizontal orientation may be maintained despite the pivot axis 71 being shifted forward or rearward within a central region extending in each direction from the center point about 25% of the overall length of the walking beam 34. The downward forces acting on the closing disks 36 and 38 would vary according to the distance and direction that the pivot axis 71 is shifted. Thus, for example, if the pivot axis 71 were to be shifted forward, the recoil spring 28 may effectively exert a greater downward force on the front closing disk 36, since it is closer to the pivot axis 71. Varying the location of the pivot axis 71 to a greater extent may result in a home position of the closing disk assembly 18 in which the walking beam 34 is inclined or declined from horizontal, such that the closing disks 36 and 38 are at different heights when in the home position. This may further vary the effective downward forces applied to the closing disks 36 and 38.

Referring to FIGS. 6-9, 11 and 13, in addition to the downward forces applied to the closing disks 36 and 38 from the recoil spring 28, each closing disk assembly 18 is subject to various forces acting on the closing disks 36 and 38, such as fore, aft and lateral forces, arising from the furrow closing operation. These forces generate moments which act on various components of the closing disk assembly 18, including the walking beam 34. The walking beam 34 can be configured to follow a load bath generated by the forces and moments acting on the closing disks 36 and 38. By empirical study, such as using finite element analysis, the walking beam 34 geometry can be tuned to match the likely load path arising from typical loading on the closing disks 36 and 38 during operation.

FIG. 11 shows a sample force diagram of the angled geometry of the walking beam 34 in the illustrated example. In this example, the portion of the load path along the first beam segment 75 is not coaxial with the load path along the second beam segment 76. Due to this angled load path, the first 75 and second 77 beam segments may also be angled in order to better optimize the location of the load path relative to the first 75 and second 77 beam segments. For example, the walking beam 34 may be configured so that the load path passes through the centerlines of the beam segments 75 and 77. By following the load path in this manner, the beam segments 75 and 77 may have be able to support the required loading with a smaller cross-sectional area than, for example, a straight walking beam. Decreasing the walking beam cross-section reduces cost and weight of the closing disk assembly 18.

The disk mounts 74 and 76 and the axle hubs 92 combine to act as lever arms extending along the pivot axes 100 between the closing disks 36 and 38 and the walking beam segments 75 and 77. As shown in FIG. 11, the lever arms 98 and 99 actually extend from the closing disks 36 and 38 to an intersection point between the beam segments 75 and 77 and the disk mounts 74 and 76, which are referred to herein as effective load transfer points 88 and 90, respectively. The effective load transfer points 88 and 90 are the general locations where the loading acting on the closing disks 36 and 38 is transferred from the disk mounts 74 and 76 to the beam segments 75 and 77. Each effective load transfer point 88 and 90 may be the point where a centerline through each beam segment 75 and 77 intersects each disk pivot axis 100.

The lever arms 98 and 99 (and the beam segments 75 and 77) may be the same or different lengths depending on the anticipated loading on the closing disks 18 and the resulting geometry of the walking beam 34 needed to follow the load path. For example, if the second closing disk 38 exerts a smaller load than the first closing disk 36, then the associated lever arm 99 may need to be longer than the other lever arm 98 so that the moments created by the closing disks 36 and 38 can be balanced about the center hub 68 and/or pivot axis 71. To achieve the beam geometry matching the load path in the illustrated example, the lever arms 98 and 99 are of different lengths, and consequently the beam segments 75 and 77 are angled with respect to one another. More specifically, each beam segment 75 and 77 diverges from a reference plane 79 that passes through the center hub 68 orthogonal to the pivot axis 71. In particular, the beam segment 75 extends at an angle α from the reference plane 79, and the beam segment 77 extends at an angle β from the reference plane 79. Thus, the disk mount 74 is brought closer to the loading force on the closing disk 36 (to effectively shorten the lever arm 98) and the disk mount 76 is moved away from the loading force on the closing disk 38 (to effectively lengthen the lever arm 99). As mentioned above, the pivot axis 71 location may be shifted from the nominal center point of the walking beam 34 within a central region, as needed.

Furthermore, to achieve the desired loading and orientation of the closing disks 36 and 38, the rotation axes 100 may be at (the same or different) oblique angles to the beam segments 75 and 77, and may also be oblique to the pivot axis 71. For example, the disk mount 74 (and the disk axis 100 of the forward closing disk 36) may form an angle θ beam segment 75 and cross at the load transfer point 88. The disk mount 76 (and the disk axis 100 of the rearward closing disk 38) may form an angle ω with the beam segment 77 and may cross at the load transfer point 90. In this configuration, both load transfer points 88 and 90 are on the same side of the reference plane 79.

In the example embodiment, the beam segments 75 and 77 are approximately the same length, while the angle α is greater than the angle β and the angle θ is greater than the angle ω. As one non-limiting example, angle α is approximately 10 degrees, angle β is approximately 5 degrees, angle θ is approximately 100 degrees, and angle ω is approximately 85 degrees. It is understood that one or more of these angles may be varied to follow a different load path.

Moreover, these angles also set the spacing of the closing disks 36 and 38 relative to the reference plane 79. In the illustrated example, the lateral spacing and angular orientation of each closing disk 36 and 38 with respect to the reference plane 79 may be approximately the same.

More specifically, and referring to FIGS. 11 and 13, the angles of the beam segments 75 and 77 and the angles of the disk axes 100 cant the closing disks 36 and 38 inward such that the forward portions of the closing disks 36 and 38 are closer to the reference plane 79 than the rearward portions in the direction of travel, which may help eliminate gaps in coverage of the ground between multiple closing disk assemblies 18, as described above. The forward 36 and rearward 38 closing disks may form angles φ1 and φ2, respectively, with the reference plane 79. A line (shown dashed in FIG. 11) extending through the forward closing disk 36 and perpendicular to its axis of rotation 100 may intersect the reference plane 79 at a point Y1. A (dashed) line extending through the rearward closing disk 38 and perpendicular to its axis of rotation 100 may intersect the reference plane 79 at a point Y2. In the example embodiment shown in FIG. 11, the point Y1 is forward of the point Y2 in the direction of travel. However, in other embodiments Y1 and Y2 may be located at the same point, or Y2 may be forward of Y1. Furthermore, it will be appreciated that φ1 and φ2 may be equal in order to present the same angle of attack with the soil and residue used to fill the furrow.

Figure 3:
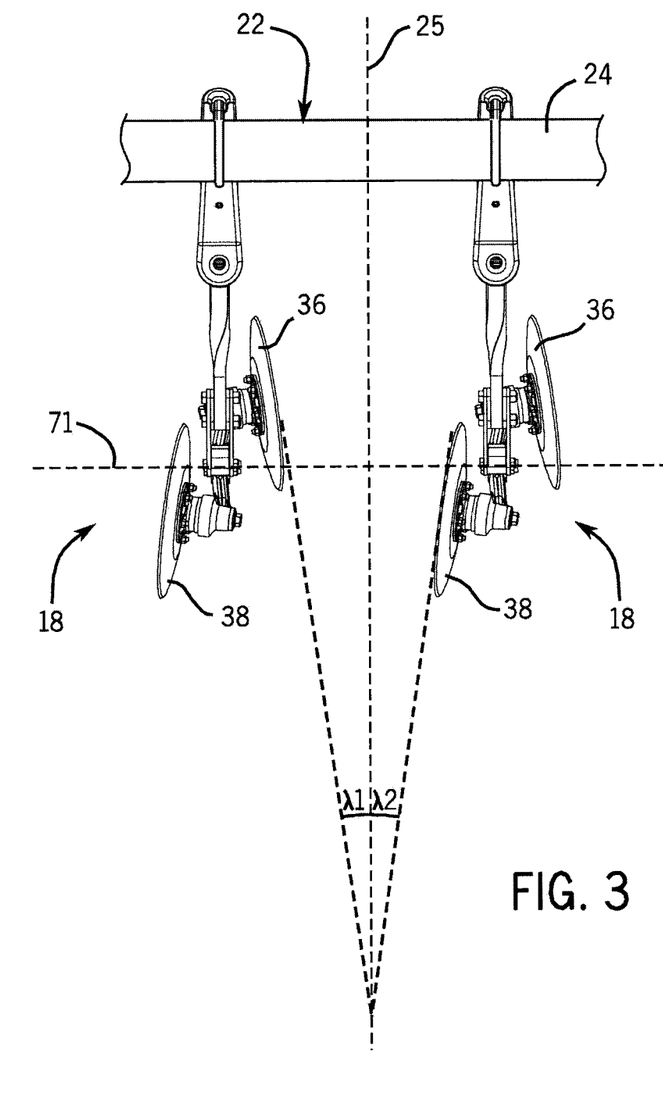
FIG. 3 is a top view of the two closing disk assemblies of FIG. 3.

Referring to FIG. 3, the inward cant of the closing disks 36 and 38, between two opposing closing disks 36 and 38 in adjacent closing disk assemblies 18, that is, the forward closing disk 36 of one closing disk assembly 18 and the rearward closing disk 38 of the adjacent closing disk assembly 18, forms a "V" shaped funnel gap between the opposing closing disks, as shown by the dashed lines in FIG. 3. The forward 36 and rearward 38 closing disks create angles λ1 and λ2, respectively, with the shank centerline 25, as shown FIG. 3. This helps the closing disks 36 and 38 to address the ground displaced by the other ground-engaging members located forward of the closing disks 36 and 38. It should be understood that the degree of funneling can be adjusted by changing the angles of the walking beam segments 75 and 77 and disk axes 100. It will be appreciated that, like the angles ϕ1 and ϕ2, angles λ1 and λ2 may be the same or different angles.

Moreover, the opposing closing disks in adjacent closing disk assemblies are offset from each other in a forward and rearward direction. As shown in FIG. 3, the forward closing disk 36 is located forward of the pivot axis 71 to the dashed line in FIG. 3, while the rearward closing disk 38 is behind the perpendicular line. The associated disk axes 100 thus intersect the perpendicular line from in front of, and behind, the perpendicular line, respectively. By offsetting the opposing closing disks in this manner, the lateral spacing between the closing disks 36 and 38 at a given fore/aft location is greater than if the opposing disks were laterally aligned. This arrangement thus aids in the flow of soil and residue through the implement by effectively increasing the lateral spacing between opposing closing disks pairs, while still providing the funneling needed to fill the trenches made by the ground-engaging shanks 16.

Figures 6, 7:
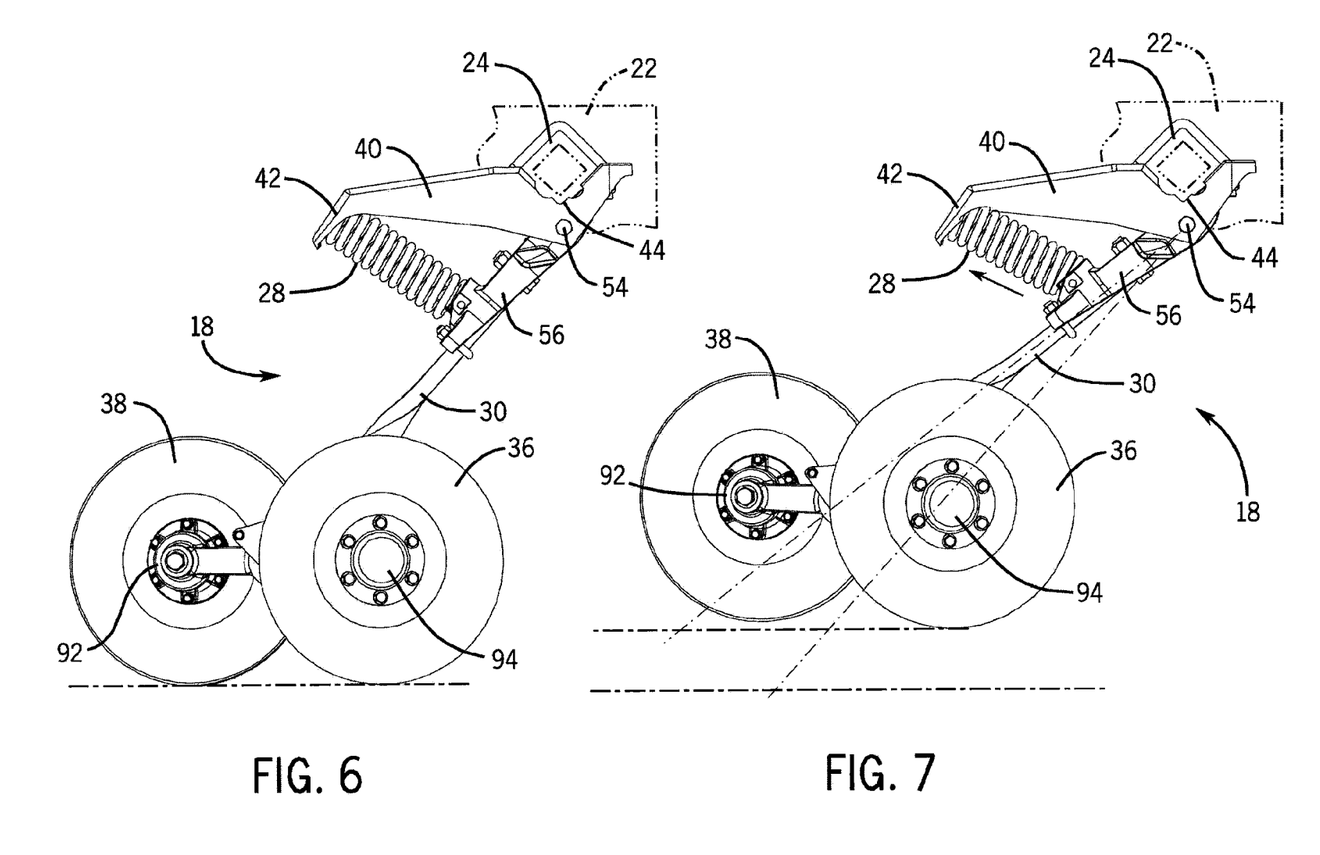
FIG. 6 is a side view of the closing disk assembly of FIG. 5 shown in a home position.
FIG. 7 is a side view similar to FIG. 6 showing the closing disk assembly in a recoiled position.

The operation of one of the closing disk assemblies 18 will now be described. When the closing disk assembly 18 is in its home position, such as when the implement is traveling along flat or unobstructed ground, the recoil spring 28 is in its relaxed state, as shown in FIG. 6. In this position, the recoil spring 28, exerts enough downward force to keep at least one of the closing disks 36 and 38 in contact with and at a constant depth in the ground to allow the closing disk to perform its closing function. During an impact event with a rigid part of the ground, such as a rock or other obstacle, the force exerted by the rigid part of the ground on the closing disk causes the support arm 30 and the pivot arm 56 to rotate upward about the pivot pin 54, as shown in FIG. 7, causing the recoil spring 28 to compress, thus absorbing the force exerted by the impact and allowing the closing disks 36 and 38 to clear the rigid part of the ground to prevent damage to the closing disk assembly 18. As the energy stored in the recoil spring 28 is released, through the recoil spring 28 decompressing, the support arm 30 and the pivot arm 56 are rotated downward to return the closing disks 36 and 38 in contact with the ground.

Figure 8:
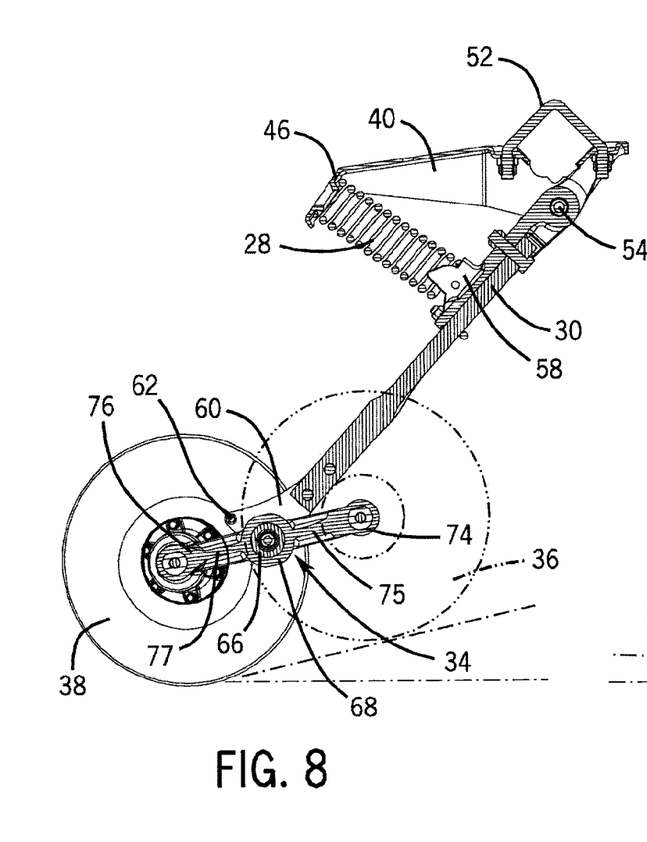
FIG. 8 is a side cross-sectional view of the closing disk assembly in the home position taken along line 8-8 of FIG. 5 with the walking beam pivoted so that the front closing disk is higher than the rear closing disk.
Figure 9:
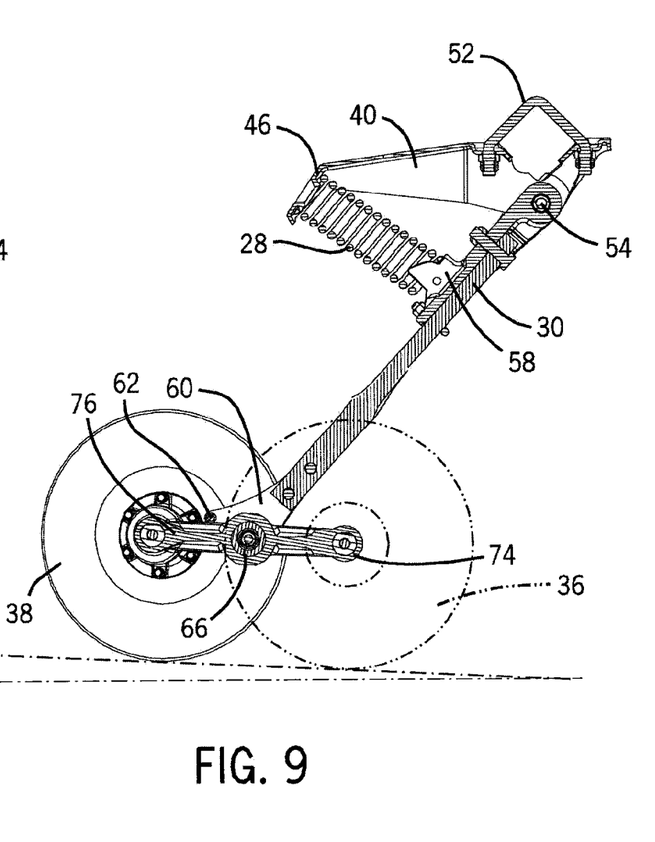
FIG. 9 is a side cross-sectional view similar to FIG. 8 with the walking beam pivoted so that the front closing disk is slightly lower than the rear closing disk.

Referring now to FIGS. 8 and 9, the walking motion of the closing disk assembly 18 allows the closing disks 36 and 38 to closely follow the contours of the ground with less clogging. The walking motion also allows the closing disk assembly 18 to attempt to keep both closing disks 36 and 38 in contact with the ground by rotating the walking beam 34 relative to the rocker assembly 32. Furthermore, the walking motion may tend to shake loose soil and debris that may gather on the closing disks 36 and 38.

The rotation of the walking beam 34 relative to the rocker assembly 32 can be limited through two rotational limiters. The spacer 62 may limit rotation in a first direction, while the lower distal end of the support arm 30 may limit rotation in the opposite direction. The walking beam 34 may be configured to pivot about the pivot axis 71 to the same or different degrees in either direction until contacting the rotation limiters. For example, the walking beam 34, and thus the closing disks 36 and 38, may pivot about 10 degrees in either direction. In the illustrated example, the walking beam 34, and thus the front closing disk 36, may pivot about 15 degrees counterclockwise (from the perspective of FIG. 8), and the walking beam 34, and thus the rear closing disk 38, may pivot about 5 degrees clockwise (from the perspective of FIG. 9).

On flat ground, the recoil spring 28 will be slightly compressed to exert a downward force, through the support arm 30 and walking beam 34, onto the closing disks 36 and 38 to keep at least one, or both, of the closing disks 36 and 38 in contact with and at a constant depth in the ground. It will be appreciated that a recoil spring with a higher spring constant will keep the closing disks 36 and 38 at a deeper depth within the soil compared to a recoil spring with a lower spring constant. If both closing disks 36 and 38 are in contact with a section of level ground, then the walking beam 34 will be substantially parallel with the ground even as the ground inclines or decline. As the work vehicle 10 moves along a section of unleveled ground, the closing disks 36 and 38 will encounter some resistance, such as through more compact soil or an incline in the angle of the ground. Since the closing disks 36 and 38 are mounted to the walking beam 34, which is rotatably coupled to the support arm 30 and mounting assembly 26, the closing disk 36 or 38 that encounters the resistance will be rotate upward.

For example, as shown in FIG. 8, if the ground beings to slope upward, then the forward closing disk 36 may move upward with the upward sloping ground, causing the walking beam 34 to rotate about the bearing 66, keeping the walking beam 34 parallel with the upward sloping ground and keeping the forward closing disk 36 and the rearward closing disk 38 at the same depth within the ground. This rotation of the forward closing disk upward movement prevents the forward closing disk 36 from cutting too deeply into the ground, which may cause the closing disk assembly 18 to become clogged. However, if the walking beam 34 attempts to rotate the forward closing disk 36 too far upward the walking beam 34 will strike the support arm 30, preventing further rotation of the walking beam 34. The force exerted by the walking beam 34 on the support arm 30 may cause the support arm 30 to rotate upward, causing the recoil spring 28 to compress, the same as if a rigid part of the soil had been encountered. The upward rotation of the support arm 30 and compression of the recoil spring 28 prevents the closing disk 36 and 38 from cutting too deeply into the ground.

Similarly, the walking beam 34 may rotate the rearward closing disk 38 upward if the rearward closing disk 38 encounters additional resistance in the ground, or if the ground slopes downwards, as shown in FIG. 9, to prevent the closing disk assembly 18 from becoming clogged. If the waking beam 34 attempts to rotate too far it will strike the spacer 62. If the closing disk assembly 18 travels on downward sloping ground, the recoil spring 28 will attempt to keep the closing disks 36 and 38 in contact with the ground by exerting a downward force on the walking beam 34 through the spacer 62. If the impact is due to the rearward closing disk 38 encountering additional resistance in the ground, the impact causes the support arm 30 to rotate upward, compressing the recoil spring 28. The upward rotation of the support arm 30 and compression of the recoil spring 28 prevents the closing disk 36 and 38 from cutting too deeply into the ground.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A closing disk assembly for an agricultural implement having a support frame, the closing disk assembly comprising: a mounting assembly having a frame mount; a support arm pivotally coupled to the mounting assembly; a rocker assembly coupled to the support arm; a walking beam pivotally coupled to the rocker assembly about a pivot axis, the walking beam having first and second beam segments that are oriented at different angles with respect to the pivot axis and a reference plane; a first and a second disk mount coupled to each of the first and second beam segments on opposite sides of the pivot axis; and first and second closing disks, the first closing disk rotatably mounted to the first disk mount and the second closing disk rotatably mounted to the second disk mount to a side of the walking beam opposite the first closing disk; wherein the first and second disk mounts of the walking beam are offset from the reference plane of the closing disk assembly such that the first and second closing disks are oriented at different angles with respect to the respective first and second beam segments.

2. The closing disk assembly of claim 1, wherein the reference plane is perpendicular to the pivot axis.

3. The closing disk assembly of claim 2, wherein each closing disk is canted with respect to the reference plane at about the same angle.

4. The closing disk assembly of claim 3, wherein the first and second closing disks rotate about respective first and second rotation axes; wherein the first and second beam segments of the walking beam extend along a load path; wherein the load path intersects the respective first and second rotation axes at respective first and second effective load transfer points; and wherein the first and second effective load transfer points are located on a common side of the reference plane.

5. The closing disk assembly of claim 4, wherein the first and second closing disks are canted inwardly toward the reference plane in a direction of travel.

6. The closing disk assembly of claim 4, wherein the first beam segment is forward of the second beam segment in a direction of travel, and wherein the first beam segment is angled with respect to the reference plane more than the second beam segment.

7. The closing disk assembly of claim 1, wherein the walking beam includes a beam hub coupled to the rocker assembly about the pivot axis and the first and second beam segments extending from the beam hub to the respective first and second disk mounts, wherein the pivot axis is located within a central region of the walking beam.

8. The closing disk assembly of claim 1, further including a ground-engaging tool having a centerline parallel to the direction of travel; wherein two adjacent closing disk assemblies are spaced apart on each side of the centerline, and wherein one of the adjacent closing disk assemblies has a forward one of its pair of closing disks closest to the centerline and the other of the adjacent closing disk assemblies has a rear one of its pair of closing disks closest to the centerline.

9. The closing disk assembly of claim 7, wherein the first beam segment is angled with respect to the second beam segment.

10. The closing disk assembly of claim 1, wherein the rocker assembly has a first end stop and a second end stop; and wherein the first and second end stops limit the rotation of the walking beam relative to the rocker assembly.

11. An agricultural implement, comprising: a support frame; and a disk gang having a plurality of closing disk assemblies mounted to the support frame; wherein each closing disk assembly includes: a mounting assembly having a frame mount; a support arm pivotally coupled to the mounting assembly; a rocker assembly coupled to the support arm; a walking beam pivotally coupled to the rocker assembly about a pivot axis passing through the walking beam and having first and second beam segments, the pivot axis being essentially perpendicular to a direction of travel of the implement; a pair of disk mounts opposingly mounted on opposite ends of the pivot axis; and a first closing disk and a second closing disk rotatably mounted to the disk mounts each on an opposite side of the walking beam; wherein the first closing disk rotates about a first axis, the second closing disk rotates about a second axis; wherein a reference plane is perpendicular to the pivot axis and each closing disk is canted with respect to the reference plane at about the same angle; and wherein the first and second beam segments are oriented with respect to the reference plane at different angles and wherein the first and second closing disks are oriented at different angles with respect to the respective first and second beam segments.

12. The agricultural implement of claim 11, wherein the first and second beam segments of the walking beam extend along a load path; wherein the load path intersects the respective first and second rotation axes at respective first and second effective load transfer points; and wherein the first and second effective load transfer points are located on a common side of the reference plane.

* * * * *